(12) United States Patent
Cheong

(10) Patent No.: US 6,188,542 B1
(45) Date of Patent: Feb. 13, 2001

(54) APPARATUS FOR LOADING A DISK CARTRIDGE

(75) Inventor: Young-min Cheong, Seoul (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/338,579

(22) Filed: Jun. 23, 1999

(30) Foreign Application Priority Data

Jun. 24, 1998 (KR) .................................................. 98-23830

(51) Int. Cl.[7] .................................................. G11B 17/02

(52) U.S. Cl. .......................................................... 360/99.06

(58) Field of Search ............................. 360/99.06, 99.02, 360/99.03, 99.07; 369/77.2, 75.2

(56) References Cited

U.S. PATENT DOCUMENTS

| | | | | |
|---|---|---|---|---|
| 5,153,792 | * | 10/1992 | Kawano | 360/99.06 |
| 5,299,077 | * | 3/1994 | Rascle et al. | 369/75.2 |
| 5,361,181 | * | 11/1994 | Kurata | 360/99.02 |
| 5,898,539 | * | 4/1999 | Yokota et al. | 360/99.06 |

FOREIGN PATENT DOCUMENTS 4-195760   7/1992   (JP) .

* cited by examiner

*Primary Examiner*—Robert S. Tupper
(74) *Attorney, Agent, or Firm*—Staas & Halsey LLP

(57) ABSTRACT

An apparatus for loading a disk cartridge is employed in a portable disk drive so as to move the disk cartridge accommodating a disk to a loading position. The loading apparatus includes a tray to receive the disk cartridge, a link mechanism to support and guide the disk cartridge at a predetermined inclined angle while the disk cartridge is initially inserted into the tray, a positioning unit to position the disk accommodated in the disk cartridge on a spindle motor by pushing an upper rear end portion of the disk cartridge as the disk cartridge is in the final stage of the movement to the loading position, a blocking unit to block the disk cartridge to prevent the disk cartridge, once positioned in the tray by the positioning unit, from being separated accidentally from the tray and a withdrawing unit to withdraw the disk cartridge from the tray. The loading apparatus minimizes the number of parts that are moved during the insertion of the disk cartridge by employing the link mechanism, and reduces the wear which may occur while the disk cartridge is being connected to a shaft of the spindle motor shaft by efficiently inserting and positioning the disk cartridge.

33 Claims, 14 Drawing Sheets

APPARATUS FOR LOADING A DISK CARTRIDGE

CROSS-REFERENCE TO RELATED APPLICATIONS

This application claims the benefit of Korean Application No. 98-23830, filed Jun. 24, 1998, in the Korean Patent Office, the disclosure of which is incorporated herein by reference.

BACKGROUND OF THE INVENTION

1. Field of the Invention

The present invention relates to a disk drive for receiving a removable disk cartridge, and more particularly, to an apparatus which uses a link mechanism for loading a disk cartridge and positioning the disk cartridge so that a disk accommodated therein is placed on a spindle motor.

2. Description of the Related Art

As demand for a more inexpensive disk drives increases, a disk cartridge has been developed which is removable, or separable, from a disk drive. Such a removable disk cartridge offers an advantage in that, when not in use, the disk cartridge can be separated from the disk drive and preserved in a safe place. Conversely, when in use, the disk cartridge received in a tray of the disk drive is loaded, so that information may be recorded on a recordable information medium, such as a disk, or already existing information may be reproduced from the recordable medium.

In the above disk drive, the disk cartridge is pushed by a user and inserted into the tray of the disk drive. The inserted disk cartridge is moved to a loading position near a head of the disk drive. Here, to rotate the disk in the disk cartridge, the disk drive is provided with a spindle motor whose shaft protrudes from a floor surface of the tray. For this reason, a disk cartridge loading apparatus has to be constructed in such a manner that the spindle motor shaft does not impede the disk cartridge during any movement of the disk cartridge. Further, the loading apparatus has to be constructed in a manner that, in the loading position, the disk cartridge is positioned on the spindle motor as the spindle motor shaft is inserted into the shaft hole which is formed on the lower portion of the disk cartridge.

One loading apparatus of this type known in the related art is disclosed in U.S. Pat. No. 5,583,710.

According to the disclosed loading apparatus, when the disk cartridge is inserted into the tray of the disk drive, the spindle motor is elevated by a DC motor and a plurality of gears so that the spindle motor is brought in contact with the disk accommodated in the disk cartridge.

Another loading apparatus is disclosed in U.S. Pat. No. 5,699,210, wherein the loading apparatus employs a slider which is obliquely movable relative to the floor surface of the tray.

According to this type of loading apparatus, the tray is provided with an oblique elevation which is formed on the floor surface at the entrance of the tray. The movable slider is disposed on the inclined projection on its one side so that it is able to obliquely slide forward into the inner portion of the tray. Accordingly, this disposed slider comes into contact with the lower surface of the disk cartridge, and the disk cartridge is inserted into the tray at a predetermined slanted angle. The movable slider is moved together with the disk cartridge by a pushing force applied to the disk cartridge, and then at a point where the movable slider brings its rear end out of contact with the oblique elevation of the tray, the movable slider is turned into a horizontal state. Accordingly, the disk cartridge is positioned on the shaft of the spindle motor which protrudes from the floor surface of the tray. A press member is disposed on an upper cover of the tray and the press member presses down the rear end of the disk cartridge so as to position the disk cartridge on the shaft of the spindle motor at the end of the loading process. Additionally, the movable slider is provided with a latch lever on its other side. The movable slider is elastically supported by a spring in a direction (outwardly) of the entrance of tray, and is unlocked by manipulating the latch lever and is then caused to retreat in the direction of the entrance of the tray. During this process, the rear end of the movable slider is elevated by the oblique elevation of the tray, permitting the disk cartridge to be withdrawn.

The loading apparatuses of disk cartridges in the related art, however, have some drawbacks to be improved as follows.

First, the loading apparatus on which the spindle motor is moved upward and downward is so constructed that the disk cartridge should be simultaneously loaded in cooperation with the spindle motor. As a result, the number of needed movable parts increases, which only increases the possibility of malfunction, as well as requiring a more complicated structure.

Second, the loading apparatus employing the movable slider is so constructed that the disk cartridge is moved along the inclined floor surface of the tray until the spindle motor shaft comes into connection with the disk in the disk cartridge. As a result, the contact portion becomes easily worn if the sloping surface has a low inclined angle. More specifically, during the movement of the disk cartridge, since the lower surface of the disk cartridge maintains contact with the shaft of the spindle motor, the lower surface of the disk cartridge may be scratched. Further, during the movement of the disk cartridge, since the spindle motor shaft is inserted into the shaft hole of the disk cartridge with an excessive contacting force, the insert portion becomes worn and the spindle motor shaft must be inserted by using an excessive force.

SUMMARY OF THE INVENTION

The present invention has been made to overcome the above-described problems of the related art, and accordingly, it is an object of the present invention to provide a loading apparatus for a disk cartridge in cooperation with a link mechanism, in which the number of movable parts can be minimized while the disk cartridge is moved, and the wear to the disk cartridge, which may be caused when the disk cartridge comes into contact with the spindle motor shaft, can be decreased since the disk cartridge is smoothly inserted into the tray and positioned on the spindle motor shaft.

Additional objects and advantages of the invention will be set forth in part in the description which follows and, in part, will be obvious from the description, or may be learned by practice of the invention.

The above and other objects of the present invention are accomplished by providing a loading apparatus for a disk cartridge, including a tray to receive the disk cartridge; a link mechanism to support and guide the disk cartridge at a predetermined inclined angle while the disk cartridge is inserted into the tray; means for positioning a disk accommodated in the disk cartridge on a spindle motor by pressing down an upper rear end portion of the disk cartridge at the end of movement of the disk cartridge which is guided by the link mechanism; means for blocking the disk cartridge to prevent the disk cartridge positioned in the tray by the positioning means from being separated accidentally from the tray; and means for withdrawing the disk cartridge to unload the disk cartridge.

The link mechanism includes a cam link, rotatably disposed on a floor surface of the tray at an entrance of the tray via a shaft pin and extending to a predetermined height in a standing position, to support and guide the disk cartridge to be inserted at a predetermined inclined angle at the initial insertion of the disk cartridge; a first slider link, linked to an upper end of the cam link on a first end thereof, extending from the upper end of the cam link to a predetermined position in the tray, and having a slide groove defined from a center of the first slider link to a second end of the first slider link; a second slider link disposed to move along the slide groove of the first slider link, having a projection defined on an upper side of the second slider link to be brought into contact with a leading end of the disk cartridge, so that the second slider link is moved together with the disk cartridge toward the inner side of the tray by the pushing force applied to the disk cartridge; a latch lever elastically supported in a clockwise direction on one end of the second slider link; and a third slider link having a locking elevation to which the latch lever is locked, extending from the entrance of the tray toward an inner side of the tray, and moved together with the second slider link by interlocking with the latch lever to its locking elevation.

Further, the positioning means includes a press member disposed on an inner side of a tray cover to pivot about a pin while having a press section to be in contact with the upper rear end portion of the disk cartridge, and an operational section formed on one end thereof and having an inclined surface of a predetermined angle; an operational projection having a sloping surface to correspond with the inclined surface of the operational section of the press member, and protruding from an end of the third slider link for rotating the press member on the pin in a counterclockwise direction during the movement of the third slider link; and a spring disposed between the press member and the tray cover to elastically support the press member in a clockwise direction.

Further, the disk cartridge blocking means includes a locking elevation protruding upward from a lower portion of the entrance of the tray to a height which is lower than the cam link in the standing position.

Also, the disk cartridge withdrawing means includes a first tension coil spring to elastically support the second slider link in the direction of the entrance of the tray (also referred to as outward with respect to the tray, meaning the direction the second slider link moves to move the disk cartridge outward from the tray); a second tension coil spring to elastically support the third slider link in the direction of the entrance of the tray (outward with respect to the tray); a solenoid valve, whose operational rod is to be in contact with a withdrawing piece extending from a rear end of the latch lever, to unlock the third slider link by pushing the withdrawing piece to rotate the latch lever in a counterclockwise direction; and an operational end formed on the rear end of the third slider link, to elevate the disk cartridge to a position for the disk cartridge withdrawal by rotating the cam link near the entrance of the tray 90° during movement of the third slider link in the direction of the tray (also referred to as a retreat of the third slider link).

According to the present invention, on one side of the cam link, a sloping surface is integrally formed to be in contact with the operational end of the third slider link, so that the cam link is not rotated in a clockwise direction prior to the advancing movement of the third slider link.

In the disk cartridge loading apparatus according to the present invention, the disk cartridge is inserted into the tray at a predetermined angle at the beginning of its insertion, due to the height of the cam link disposed near the entrance of the tray. Accordingly, the disk cartridge is inserted smoothly without being impeded by the spindle motor shaft. As the disk cartridge is inserted, the leading end of the disk cartridge comes in contact with an elevation protruding from the second slider link within the tray, and accordingly, the second slider link is moved toward the inner side of the tray together with the disk cartridge by the pushing force of a user applied to the disk cartridge.

As soon as the second slider link reaches the end of the slide groove of the first slider link, the first slider link is moved. Simultaneously, the third slider link is also moved, when the latch lever is stopped by a stop elevation of the third slider link. Then, since the cam link is connected with the first slider link, the disk cartridge is turned to the horizontal state by the cam link which is rotated in a clockwise direction. In response to the movement of the third slider link, the press member is rotated in a counterclockwise direction to press the upper rear end of the disk cartridge, so that the disk accommodated in the disk cartridge is positioned on the spindle motor. In such a situation, by the rotational movement of the cam link, the disk cartridge performs a circular arc movement during the loading process. Accordingly, the disk cartridge is smoothly moved to the loading position without being impeded by other parts.

On withdrawal of the disk cartridge, the solenoid valve is operated by a separate switch. Then, the latch lever is rotated in a counterclockwise direction to unlock the third slider link. Accordingly, the third slider link retreats, and the operational end thereof rotates the cam link in a counterclockwise direction. As a result, the disk cartridge is elevated to a height for withdrawal out of reach of the stop elevation so as to retreat outward from the tray by the first tension coil spring.

BRIEF DESCRIPTION OF THE DRAWINGS

The above objects and advantages will be more apparent by describing the present invention with reference to the accompanying reference drawings, in which.

DESCRIPTION OF THE PREFERRED EMBODIMENTS

Figure 1:
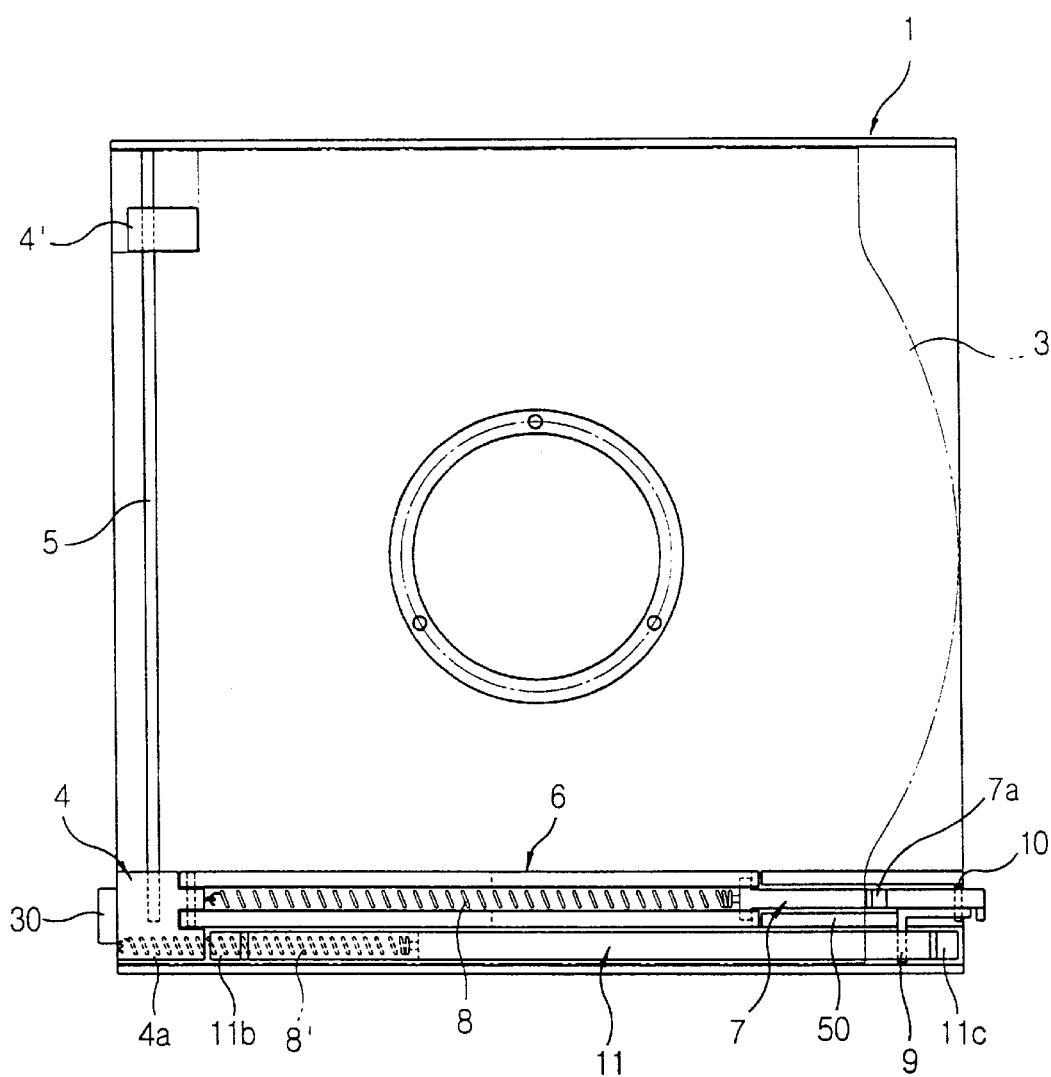
FIG. 1 is a plan view of a disk cartridge loading apparatus according to a first embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIGS. 1 to 4 show a disk cartridge loading apparatus employing a link mechanism according to a first embodiment of the present invention.

Figure 2A:
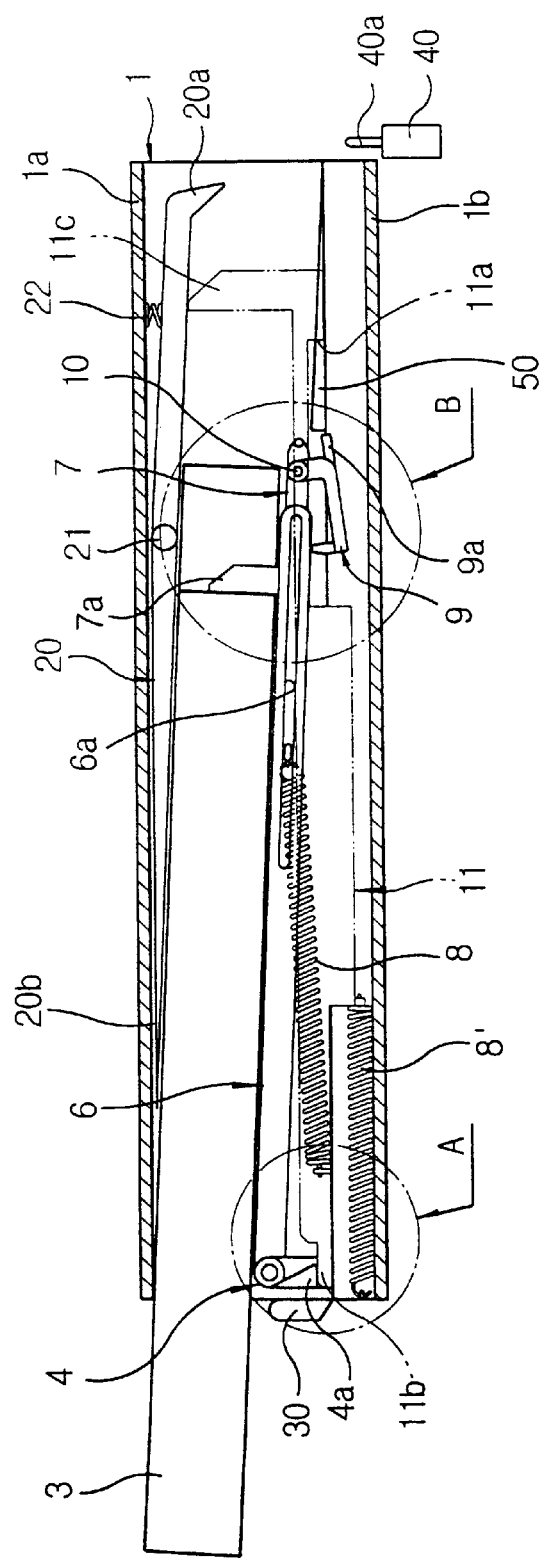
FIGS. 2A to 2D are cross-sectional views for explaining an operation of the disk cartridge loading apparatus shown in FIG. 1.
Figure 2B:
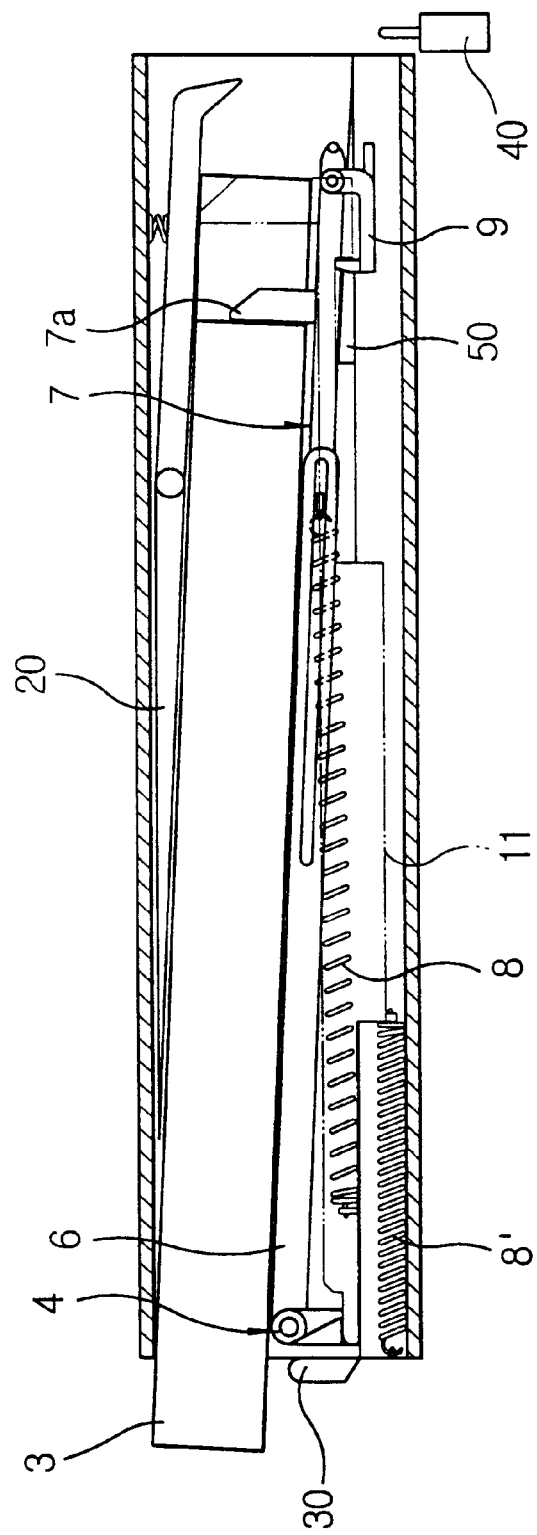
Figure 2C:
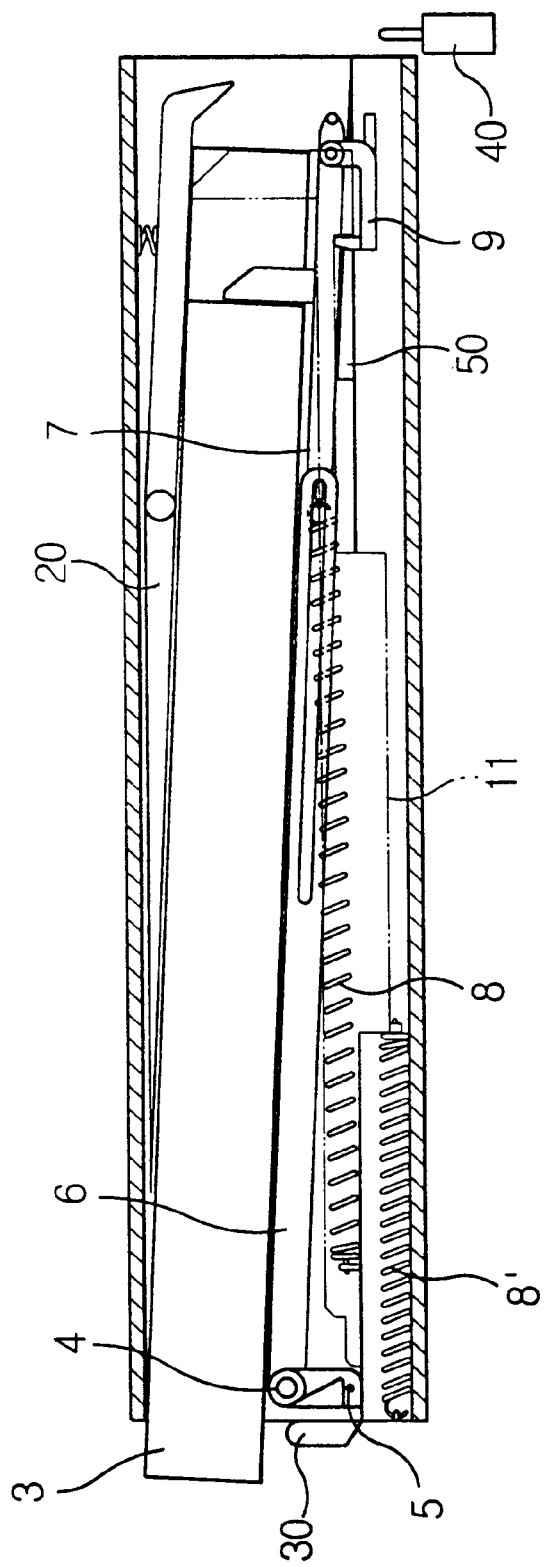
Figure 2D:
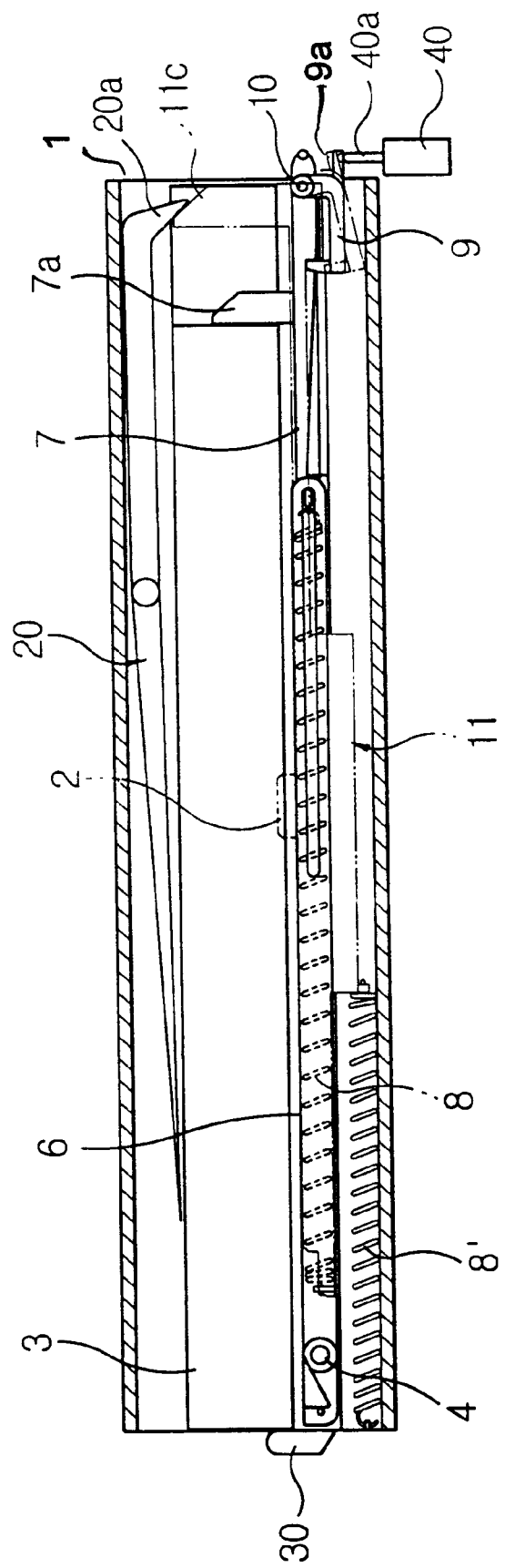

A shaft 2 of a spindle motor protrudes from a center of a floor surface of a tray 1 as shown in FIG. 2D. Further, the tray 1 has upper and lower covers 1a and 1b (see FIG. 2A), so that a disk cartridge 3 can be inserted through an inner passage (entrance) defined between the upper and lower covers 1a and 1b of the tray 1. The inserted disk cartridge 3 is positioned on the shaft 2 of the spindle motor so that a disk (not shown) accommodated therein can be rotated at a predetermined speed by the spindle motor.

Figure 3:
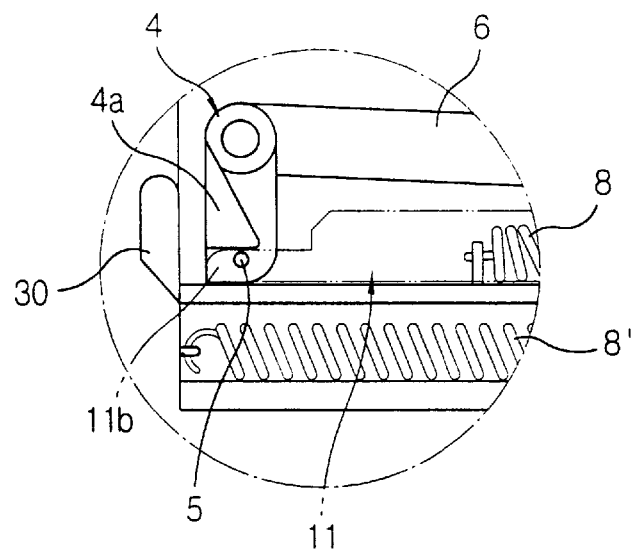
FIG. 3 is a detailed view of an area A shown in FIG. 2A.
Figure 4:
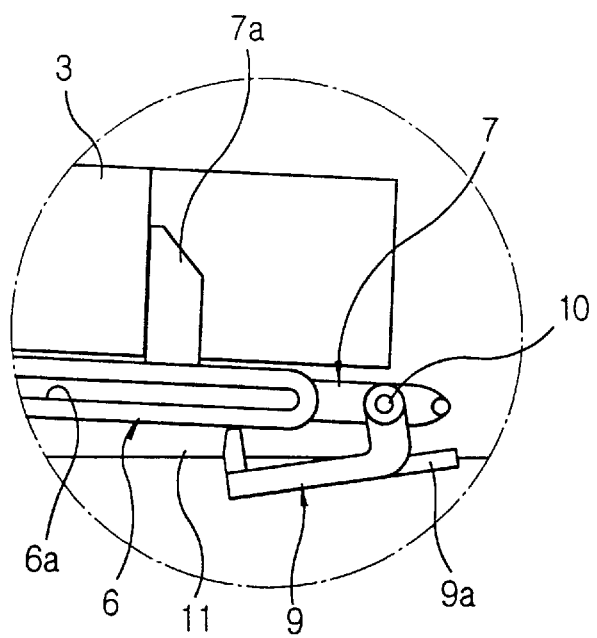
FIG. 4 is a detailed view of a area B shown in FIG. 2A.

At the entrance of the tray 1, cam links 4 and 4' having a predetermined height are disposed on opposite sides of the floor surface of the tray 1, and are connected with each other by a shaft pin 5. Here, as shown in FIG. 3, the cam links 4 and 4' (the cam link 4' cannot be seen as it is directly behind the cam link 4) are pivoted about the shaft pin 5 (up to 90° in a clockwise or counterclockwise direction). As shown in FIG. 2A, the cam links 4 and 4' (4' not being shown as it is directly behind the cam link 4 in this drawing) cause the disk cartridge 3 to be inserted into the tray 1 at a predetermined angle during the initial insertion of the disk cartridge 3. As a result, the disk cartridge 3 is inserted without being impeded by the shaft 2 of the spindle motor.

The cam link 4 is provided with a slanted surface 4a, and has an upper end linked to a first slider link 6. Here, the first slider link 6 extends from the upper end of the cam link 4 to the inner portion of the tray 1. The first slider link 6 acts as a support to guide the disk cartridge 3 at a predetermined angle, while the cam link 4 stays in a perpendicular relation with respect to the tray 1 during the initial insertion of the disk cartridge 3.

The first slider link 6 is provided with a slide groove 6a which extends from the center of the first slider link 6 to the end of the first slider link 6 opposite that in contact with the cam link 4. The slide groove 6a is provided with a second slider link 7 so that the second slider link 7 can move along the slide groove 6a. A projection 7a of a predetermined height protrudes from the upper surface of the second slider link 7. The second slider link 7 is elastically supported in the direction the entrance of the tray 1 (outward with respect to the tray 1) by a first tension coil spring 8. As the leading end of the disk cartridge 3 comes in contact with the projection 7a of the second slider link 7, the second slider link 7 is moved in the direction opposite that of the entrance of the tray (advanced) together with the disk cartridge 3 by the pushing force of a user applied to the disk cartridge 3.

The second slider link 7 is connected to a latch lever 9 on one end thereof by a pin 10, and the latch lever 9 is to elastically supported in a clockwise direction by a V-shaped spring (not shown). A withdrawing piece 9a is integrally formed on the rear end of the latch lever 9, and will be described in a later part of this specification.

In addition, a third slider link 11 is disposed on the floor surface of the tray 1, more particularly, neighboring the first and second slider links 6 and 7, and extending from the entrance of the tray 1 to an inner portion of the tray 1. A stop elevation 11a is formed on a predetermined area of the lower surface of the third slider link 11. The latch lever 9 is caught by the stop elevation 11a. When the latch lever 9 is caught in the stop elevation 11a, the third slider link 11 is moved together with the second slider link 7 in the same direction. Further, on one side of the third slider link 11, i.e., on the side facing the entrance of the tray 1, an operational end 11b thereof is formed to rotate the cam link 4 in a counterclockwise direction. An operational projection 11c protrudes from the other end of the third slider link 11 at a predetermined height. The third slider link 11 is elastically supported in the direction of the entrance of the tray (outward with respect to the tray 1) by a second tension coil spring 8'.

In the disk cartridge loading apparatus employing a link mechanism according to the first embodiment of the present invention, the loading apparatus includes the link mechanism that supports and guides the disk cartridge 3 in such a manner that the disk cartridge 3 is inclined a predetermined angle during the initial insertion of the disk cartridge 3. The loading apparatus further includes means for positioning the disk accommodated in the disk cartridge 3 on the spindle motor by pushing an upper rear end portion (the upper surface at a side nearest the entrance of the tray 1) of the disk cartridge 3 at the final stage of the insertion of the disk cartridge 3 when the disk cartridge 3 is guided by the link mechanism, means for blocking the disk cartridge 3 to prevent accidental separation of the disk cartridge 3 from the tray 1 in a state that the disk cartridge 3 is positioned in the tray 1 by the positioning means, and means for withdrawing the disk cartridge 3 for an unloading process. These will be described in greater detail below.

The positioning means includes the operational projection 11c protruding from the end of the third slider link 11 at a predetermined height, and a press member 20, disposed on an inner lower side of the tray cover 1a to pivot about a pin 21, having an operational section 20a with a slanted surface corresponding to the slanted surface of the operational projection 11c. The third slider link 11 is moved so that the operational projection 11c on the end of the third slider link 11 cooperates with the operational section 20a of the press member 20. Accordingly, the press member 20 is rotated on the pin 21 in a counterclockwise direction, to press the rear end portion of the disk cartridge 3, and thereby the disk cartridge 3 is maintained in position in the tray 1. The press member 20 is always elastically supported in a clockwise direction by a spring 22 disposed between the press member 20 and the lower side of the tray cover 1a. The other end of the press member 20 is provided with a press section 20b which comes into contact with the upper rear end of the disk cartridge 3 (which is the upper surface of the disk cartridge 3 at a side closest to the entrance of the tray 1).

The blocking means includes a blocking projection 30 protruding upward from the lower potion at the entrance of the tray 1. Here, the blocking projection 30 is in a lower position than the cam link 4 in a standing position, so that the disk cartridge 3 can be inserted without contact of its lower surface with the blocking projection 30.

The disk cartridge withdrawing means includes, two tension coil springs, as above mentioned, the first one being the first tension coil spring 8 for elastically supporting the second slider link 7 outward with respect to the tray 1, and the second being a second tension coil spring 8' for elastically supporting the third slider link 11 in the direction of the entrance of the tray 1 (outward with respect to the tray 1); an operational end 11b, formed on the rear end (the end closest to the entrance of the tray 1) of the third slider link 11, to elevate the disk cartridge 3 to a withdrawing position, by rotating the cam link 4 90° at the entrance of the tray 1 in a counterclockwise direction during movement of the third slider link 11 in the direction of the entrance of the tray 1 (a retreat of the third slider link 11); and a solenoid valve 40 for bringing an operational rod 40a into contact with the withdrawing piece 9a extending from the rear end of the latch lever 9. Thus, as the solenoid valve 40 is operated, the operational rod 40a thereof pushes the withdrawing piece 9a, so that the latch lever 9 is rotated in a counterclockwise direction. Accordingly, the third slider link 11 is unlocked, and is caused to move in the direction of the entrance of the tray 1 (retreat) by the second tension coil spring 8'. During the retreat of the third slider link 11, the operational end 11b of the third slider link 11 rotates the cam link 4 in a counterclockwise direction, so that the disk cartridge 3 is elevated to the withdrawing position. Then, the first tension coil spring 8 causes the second slider link 7 to move in the direction of the entrance of the tray 1 (retreat) to withdraw the disk cartridge 3 from the tray 1.

In the figures, the reference numeral 50 refers to an inclined guiding section to guide the second slider link 7 during the movement of the second slider link 7. Here, the inclined guiding section 50 is disposed at a slide surface of the second slider link 7 on the floor surface of the tray 1. Further, the inclined guiding section 50 is downwardly sloped toward the inner portion of the tray 1 to efficiently guide the second slider link 7.

Hereinafter, the operation of the disk cartridge loading apparatus according to the first embodiment of the present invention will be described with reference to the accompanying FIGS. 2A to 2D.

FIG. 2A shows the disk cartridge in the initial stage of its insertion, FIGS. 2B and 2C show the disk cartridge on the way to the loading position, and FIG. 2D shows the disk cartridge positioned in the loading position.

As shown in FIG. 2A, in the initial stage of insertion of the disk cartridge, the cam links 4 and 4' at the entrance of the tray 1 are in a standing position, so that the disk cartridge 3 is inserted into the tray 1 in a manner so that it is inclined at a predetermined angle. Here, since the slanted surface 4a of the cam link 4 is locked with the operational end 11b of the third slider link 11, the cam link 4 is not rotated by the external force that pushes the disk cartridge 3.

In this stage, the disk cartridge 3 is continuously pushed so that the second slider link 7 is advanced, because the leading end of the disk cartridge 3 is in contact with the projection 7a of the second slider link 7. The second slider link 7 is guided by the inclined guiding section 50. Here, as shown in FIG. 2B, the latch lever 9 disposed on the end of the second slider link 7 is locked with the stop elevation 11a of the third slider link 11 as the second slider link 7 continues to be advanced, locking the third slider link 11 to the second slider link 7 so that the third slider link 11 advances further into the tray 1. Also, when the second slider link 7 is advanced to the extreme end of the slide groove 6a of the first slider link 6, the first slider link 6 is moved in conjunction with the second slider link 7.

Accordingly, as shown in FIG. 2C, the operational end 11b of the third slider link 11 is separated from the slanted surface 4a of the cam link 4, so that the cam link 4 is enabled to be rotated in a clockwise direction. Here, since the cam link 4 is linked to the first slider link 6, the cam link 4 is rotated in a clockwise direction as the first slider link 6 is advanced. The cam link 4' rotates in unison with the cam link 4 due to the connection of the two element by the shaft pin. More specifically, the disk cartridge 3, which was inserted initially at a predetermined angle, is advanced and rotated to a horizontal state, so that the disk cartridge 3 is finally positioned on the spindle motor.

Meanwhile, as the third slider link 11 in a situation like FIG. 2C keeps advancing, the operational projection 11c on the end thereof comes in contact with the operational section 20a of the press member 20 so that they cooperate with each other. As a result, the press member 20 is rotated on the pin 21 in a counterclockwise direction, and the press section 20b of the press member 20 presses the upper rear end portion of the disk cartridge 3 (the side nearest the entrance of the tray 1) just before the final state of insertion so that the disk cartridge 3 is maintained in position in the tray 1.

FIG. 2D shows the disk cartridge 3 finally positioned. As shown in FIG. 2D, the rear end of the completely positioned disk cartridge 3 is locked by the blocking projection 30 at the entrance of the tray 1, so that the disk cartridge 3 is prevented from accidentally separating from the tray 1. In this situation, the information is recorded and/or the existing information is reproduced efficiently.

After recording and/or reproducing the information while the disk cartridge 3 is positioned, the disk cartridge 3 is withdrawn as follows. First, the solenoid valve 40 positioned on the rear end of the tray 1 is operated by a separate switch. Then, the operational rod 40a of the solenoid valve 40 pushes the withdrawing piece 9a of the latch lever 9. Accordingly, the latch lever 9 is rotated in a counterclockwise direction, unlocking the third slider link 11 from the second slider link 7. Then, the third slider link 11 is caused to retreat toward the entrance of the tray 1 due to the second tension coil spring 8'. As the operational end 11b of the third slider link 11 contacts and rotates the cam link 4 at the entrance of the tray 1 in a counterclockwise direction, the cam link 4 starts to stand up, elevating the rear end of the disk cartridge 3 higher than the blocking projection 30. In such a situation, as the third slider link 11 moves in the direction of the entrance of the tray 1 (retreats), the press member 20 is released from the operational projection 11c, because the press member 20 is rotated in a clockwise direction by the spring 22.

Further, when the disk cartridge 3 is elevated by the cam link 4 to the withdrawal height for the disk cartridge 3, the second slider link 7 is caused to retreat toward the entrance of the tray 1 by the first tension coil spring 8, so that the disk cartridge 3 can be withdrawn.

Figure 5:
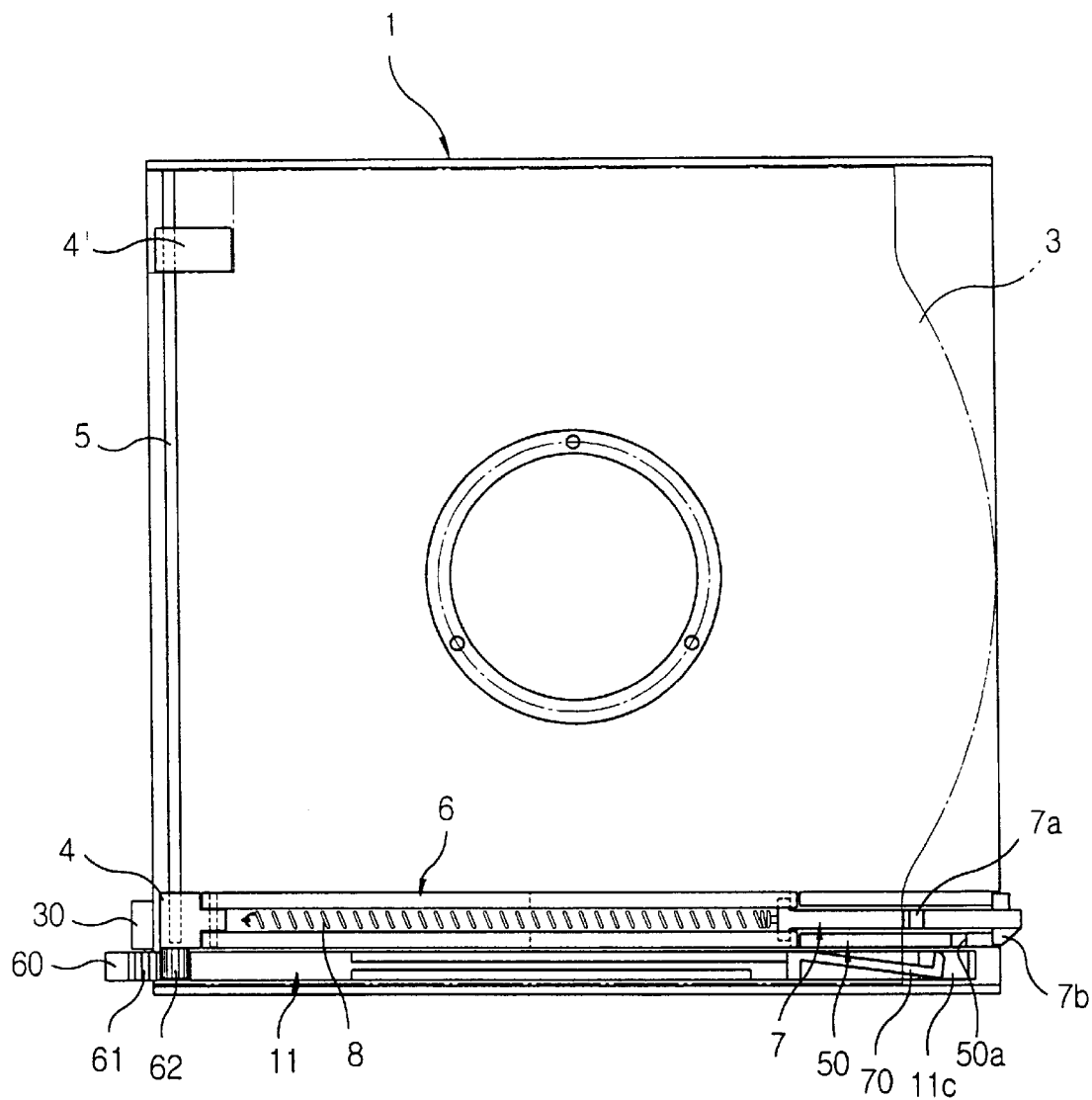
FIG. 5 is a plan view of a disk cartridge loading apparatus according to a second embodiment of the present invention.
Figure 6A:
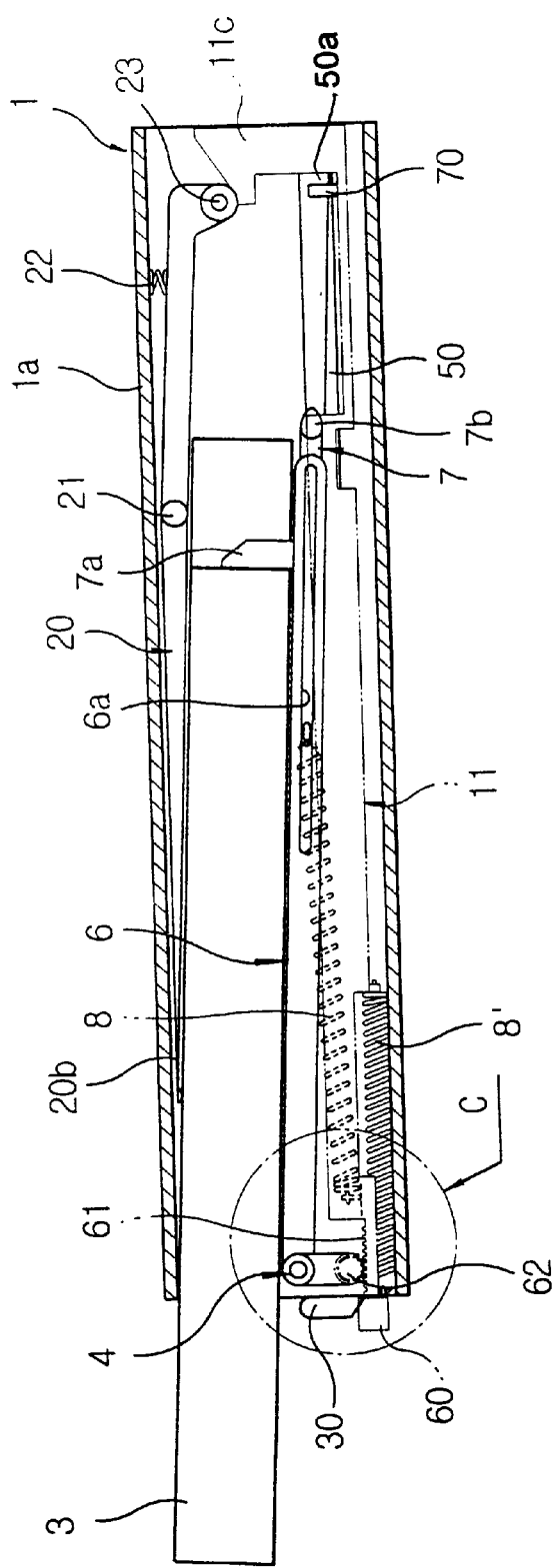
FIGS. 6A to 6C are cross-sectional views for explaining an operation of the disk cartridge loading apparatus shown in FIG. 5.
Figure 6B:
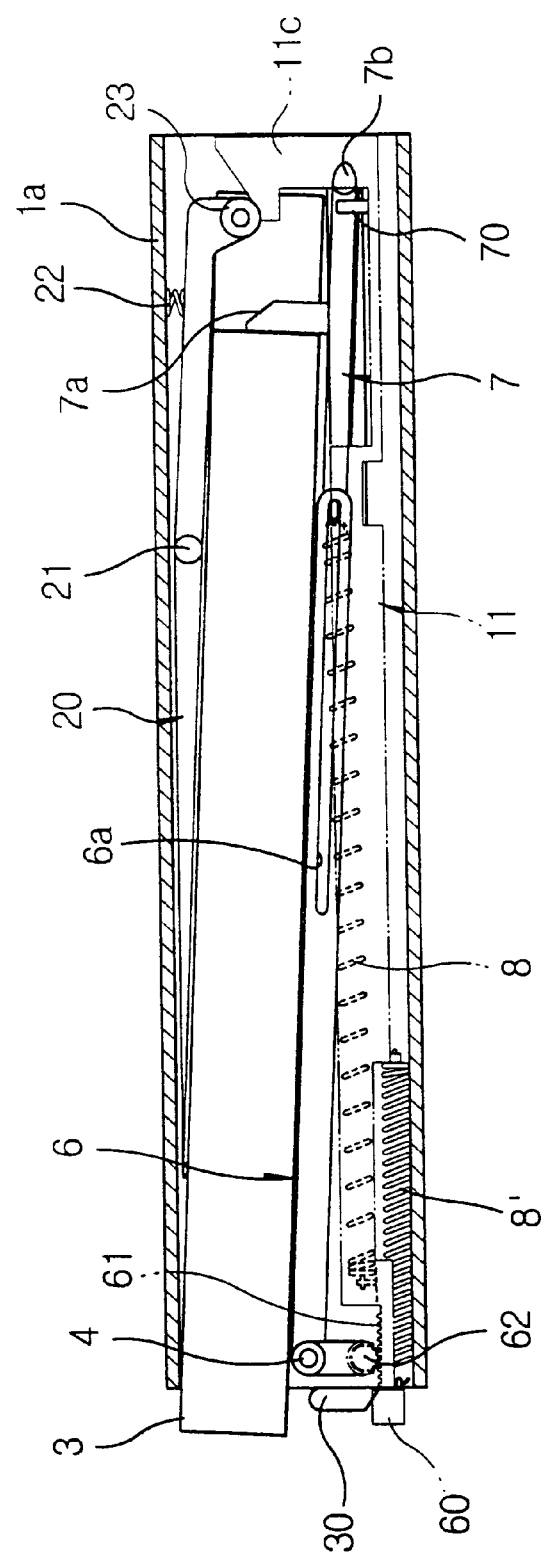
Figure 6C:
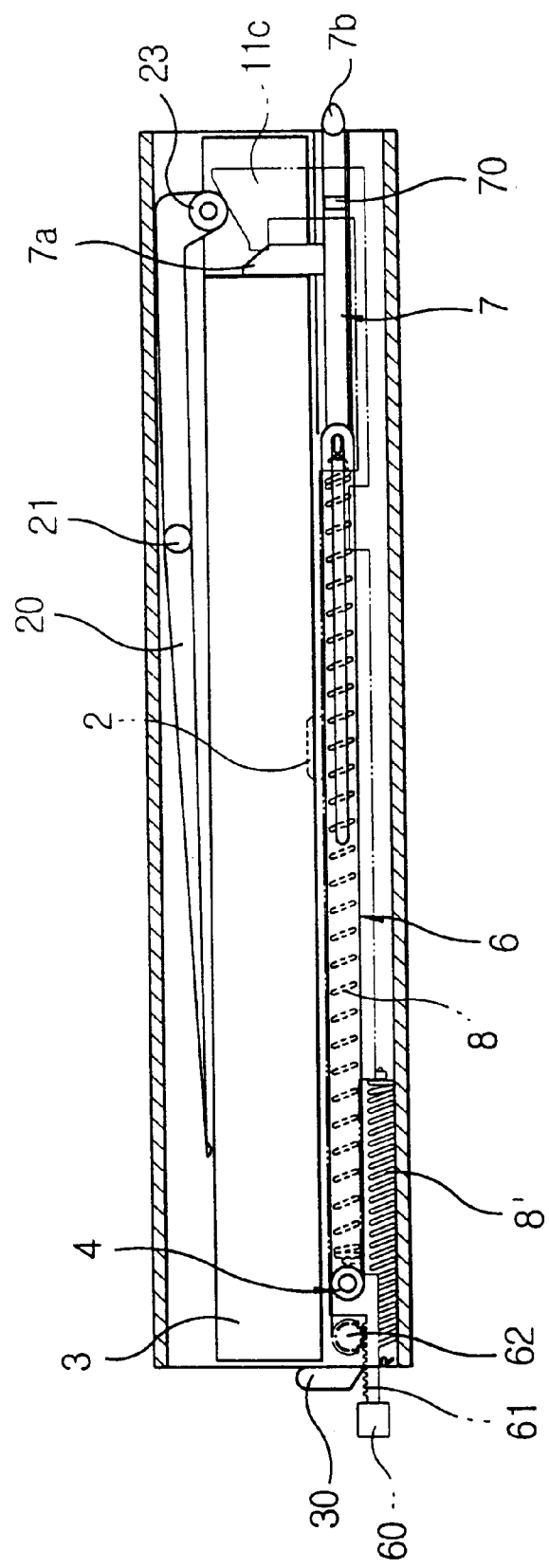
Figure 7:
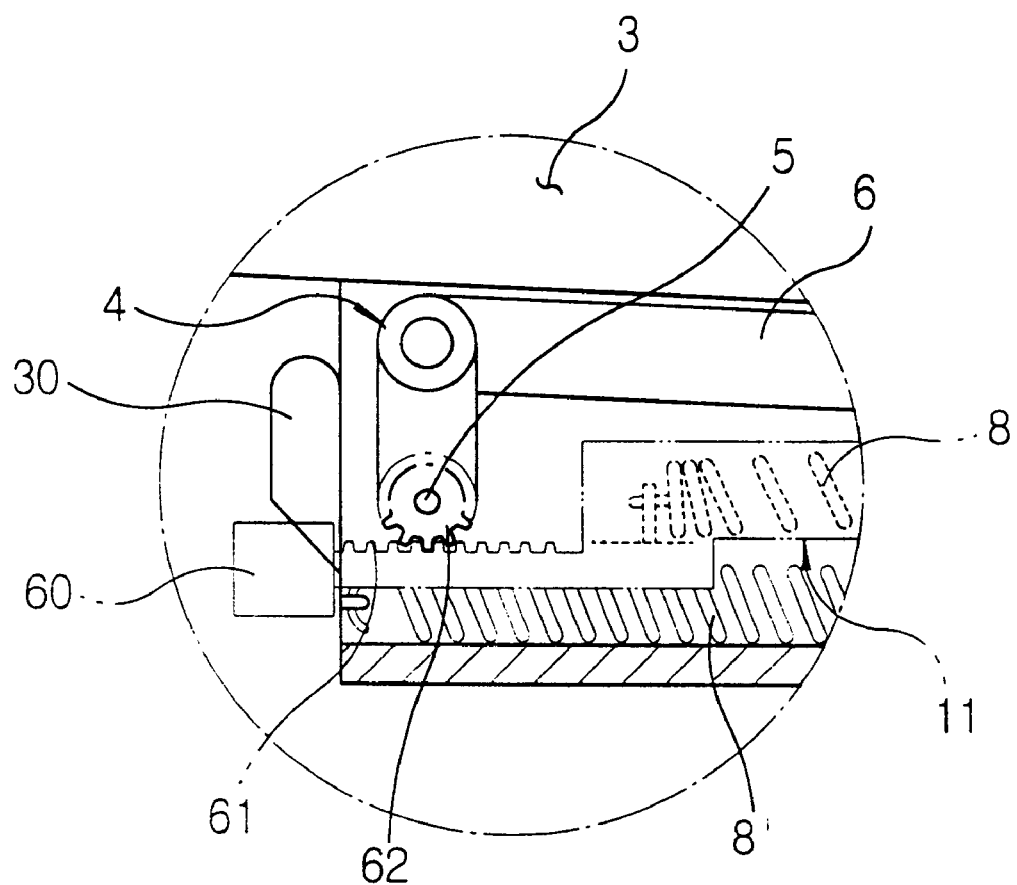
FIG. 7 is a detailed view of a area C shown in FIG. 6A.

FIG. 5 is a plan view of the disk cartridge loading apparatus according to the second embodiment of the present invention, FIGS. 6A to 6C are cross-sectional views for explaining the operation of the disk cartridge loading apparatus shown in FIG. 5, and FIG. 7 is a detailed view of the area C shown in FIG. 6A. The second embodiment will be described below with reference to these figures.

Throughout the description of the second embodiment, the like elements will be given the same reference numerals as in the first embodiment for convenience of the description, and the specific description of the like elements will be omitted.

As shown in the figures, the basic structure of the second embodiment is quite similar to that of the first embodiment.

According to the second embodiment, the loading apparatus essentially includes a tray 1, a link mechanism to support and guide a disk cartridge 3 at a predetermined inclined angle in the initial stage of its insertion, wherein the link mechanism has cam links 4 and 4' which are rotatably disposed on the tray floor surface near an entrance of the tray 1 through a shaft pin 5; means for positioning a disk accommodated in the disk cartridge 3 on the spindle motor shaft 2 by pressing down the upper rear end of the disk cartridge 3 in the final stage of the insertion of the disk cartridge 3, which is guided by the link mechanism; means for blocking the disk cartridge 3 to prevent an accidental separation of the disk cartridge 3 from the tray 1 in a state that the disk cartridge 3 is positioned in the tray 1; and means for withdrawing the disk cartridge 3 from the tray 1 for an unloading process of the disk cartridge 3.

The link mechanism includes the cam links 4 and 4', a first slider link 6 whose one end is linked to the upper end of the cam link 4, a second slider link 7 disposed to be moved along a slide groove 6a of the first slider link 6, an inclined guiding section 50 disposed on the floor surface of the tray 1 for guiding the second slider link 7 while the second slider link 7 is moved, a third slider link 11 having a press projection 60 protruding outward from the entrance of the tray 1, and extending toward an inner side of the tray 1 neighboring with the first and second slider links 6 and 7, and a hook 70 disposed on a side surface of the third slider link 11 to be elastically supported in a counterclockwise direction.

Here, the second slider link 7 includes a projection 7a in contact with the leading end of the disk cartridge 3, and a slanted projection 7b formed on one end thereof. The second slider link 7 is moved to the inner side of the tray together with the disk cartridge 3 by the pushing force applied by a user to the disk cartridge 3.

Further, the inclined guiding section 50 is provided with a locking hole 50a defined by opening one side portion thereof. Also, the third slider link 11 has the hook 70 which is integrally formed on the side thereof to be selectively inserted into the locking hole 50a, thereby maintaining the initial position of the third slider link 11.

Further, the positioning means includes an operational projection 11c protruding from the end of the third slider link 11, a press member 20 pivotally disposed in the tray cover 1a about a pin 21 to be rotated in response to the movement of the operational projection 11c, thereby pressing the rear end of the disk cartridge 3, and a spring 22 disposed between the press member 20 and the tray cover 1a to elastically support the press member 20 only in a clockwise direction.

Here, the operational projection 11c is designed to rotate the press member 20 in a counterclockwise direction while moving in the direction of the entrance of the tray 1 (retreating) together with the third slide link 11 at the final movement of the disk cartridge 3. Further, on one end of the press member 20 is disposed a guide roller 23 to be in contact with the slanted side of the operational projection 11c. The other end of the press member 20 is provided with a press section 20b which makes contact with the rear end of the disk cartridge 3.

Finally, the distinctive difference is found between the withdrawing means of the second embodiment and that of the first embodiment.

The withdrawing means of the second embodiment includes the press projection 60 extending from the end of the third slider link 11 and protruding from the entrance of the tray 1 through the lower portion of the cam link 4, a first tension coil spring 8 to elastically support the second slider link 7 outward with respect to the tray 1, a second tension coil spring 8' to elastically support the third slider link 11 in the direction of the entrance of the tray 1 (outward with respect to the tray 1), a rack 61 formed on an area of the third slider link 11 which is in contact with the cam link 4 to rotate the cam link 4 in response to the movement of the third slider link 11, and a pinion 62 formed on the cam link 4 to correspond with the rack 61 of the third slider link 11. In such a structure, by pressing the press projection 60 of the third slider link 11, the cam link 4 is rotated in a counterclockwise direction to elevate the disk cartridge 3 to the withdrawal height, and sequentially, the second slider link 7 is biased in the direction of the entrance of the tray (retreat) due to the elasticity of the first tension coil spring 8, so that the disk cartridge 3 is withdrawn outward from the tray 1.

Hereinafter, the operation of the disk cartridge loading apparatus constructed as above according to the second embodiment of the present invention will be described in greater detail with reference to FIGS. 6A to 6C.

FIG. 6A shows the disk cartridge in the initial stage of its insertion. As shown, the disk cartridge 3 is inserted into the tray 1 at a predetermined inclined angle with respect to the cam links 4 and 4' at the entrance of the tray 1. Here, the leading end of the disk cartridge 3 is in contact with the projection 7a of the second slider link 7. Further, the third slider link 11 is locked by the hook 70 disposed on one side thereof as the hook 70 is inserted into the locking hole 50a of the inclined guiding section 50. The guide roller 23 of the press member 20 is put into contact with the operational projection 11c of the third slider link 11 which is locked as above. The press member 20 maintains its initial state, elastically supported by the spring 22 in a clockwise direction.

Then, as the disk cartridge 3 is pushed further into the tray 1 from its initial state, since the leading end of the disk cartridge 3 is in contact with the projection 7a of the second slider link 7, the second slider link 7 is moved (advanced) in the same direction as the disk cartridge 3 is moved by the user. As shown in FIG. 6B, the slanted projection 7b formed on the end of the second slider link 7 pushes the hook 70 of the third slider link 11 locked in the locking hole 50a when the slanted projection 7b passes the locking hole 50a of the inclined guiding section 50. As a result, the hook 70 is separated from the locking hole 50a. Accordingly, the third slider link 11 is unlocked, so that the third slider link 11 is biased in the direction of the entrance of the tray 1 (retreats) due to the second tension coil spring 8'. As the third slider link 11 moves in the direction of the entrance of the tray 1 (retreats), the pinion 62 which is engaged with the rack 61 of the third slider link 11 is rotated, so that the cam link 4 is rotated in a clockwise direction. Simultaneously, since the guide roller 23 of the press member 20 is in contact with the operational projection 11c formed on the third slider link 11, the press member 20 is rotated in a counterclockwise direction on the pin 21 as the third slider link 11 moves in the direction of the entrance of the tray 1 (retreats). Accordingly, the press section 20b of the press member 20 pushes the rear end of the disk cartridge 3 (upper side of the disk cartridge nearest the entrance of the tray 1).

As described above, the disk cartridge 3 is moved to the loading position of the tray 1 exactly, and the information is recorded and/or reproduced on/from the disk (not shown) accommodated in the disk cartridge (see FIG. 6C).

In such a situation, in order to withdraw the disk cartridge 3, the press projection 60 protruding outward from the tray 1 is depressed. If the press projection 60 is depressed, the third slider link 11 is advanced in a direction away from the entrance of the tray 1, and the pinion 62 engaged with the rack 61 of the third slider link 11 is rotated, so that the cam link 4 is rotated in a counterclockwise direction, and accordingly, the disk cartridge 3 is elevated to the withdrawal height of the disk cartridge 3. Simultaneously, as the third slider link 11 is advanced, the hook 70 is re-inserted into the locking hole 50a of the inclined guiding section 50, so that the third slider link 11 is locked. Further, the press member 20 is returned to its initial position, and in this situation, the second slider link 7 is biased in the direction of the entrance of the tray 1 (retreats) due to the first tension coil spring 8, so that the disk cartridge 3 is withdrawn outwardly.

Figure 8A:
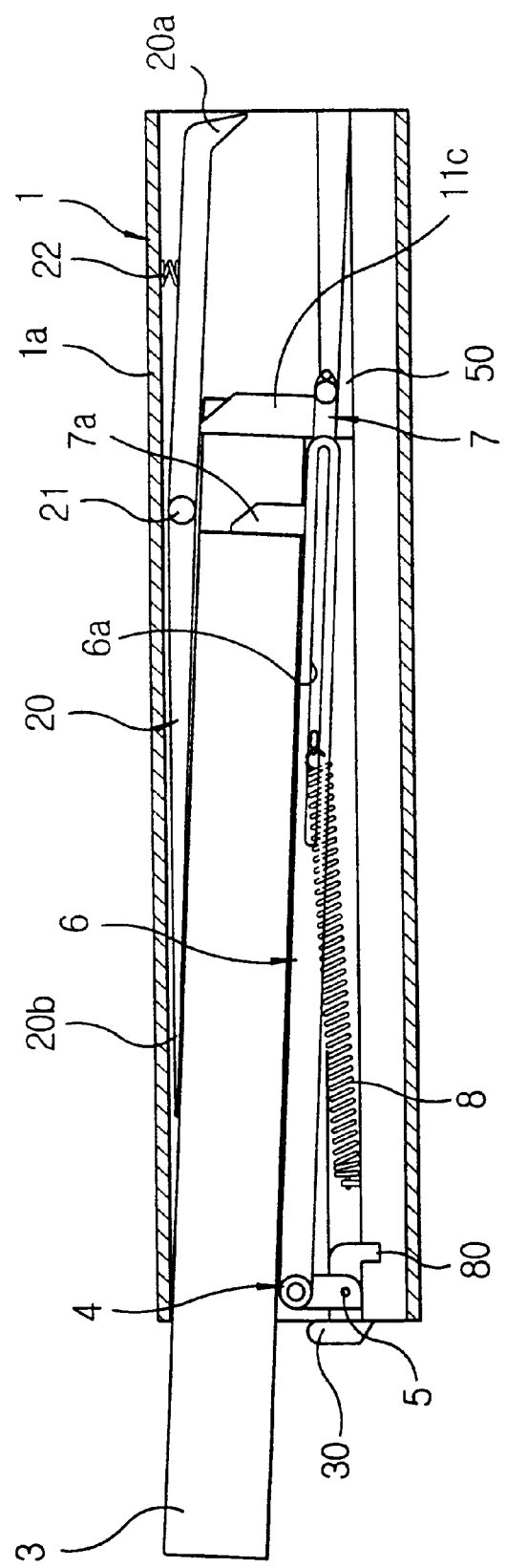
FIGS. 8A to 8C are cross-sectional views for explaining an operation of a disk cartridge loading apparatus according to a third embodiment of the present invention.
Figure 8B:
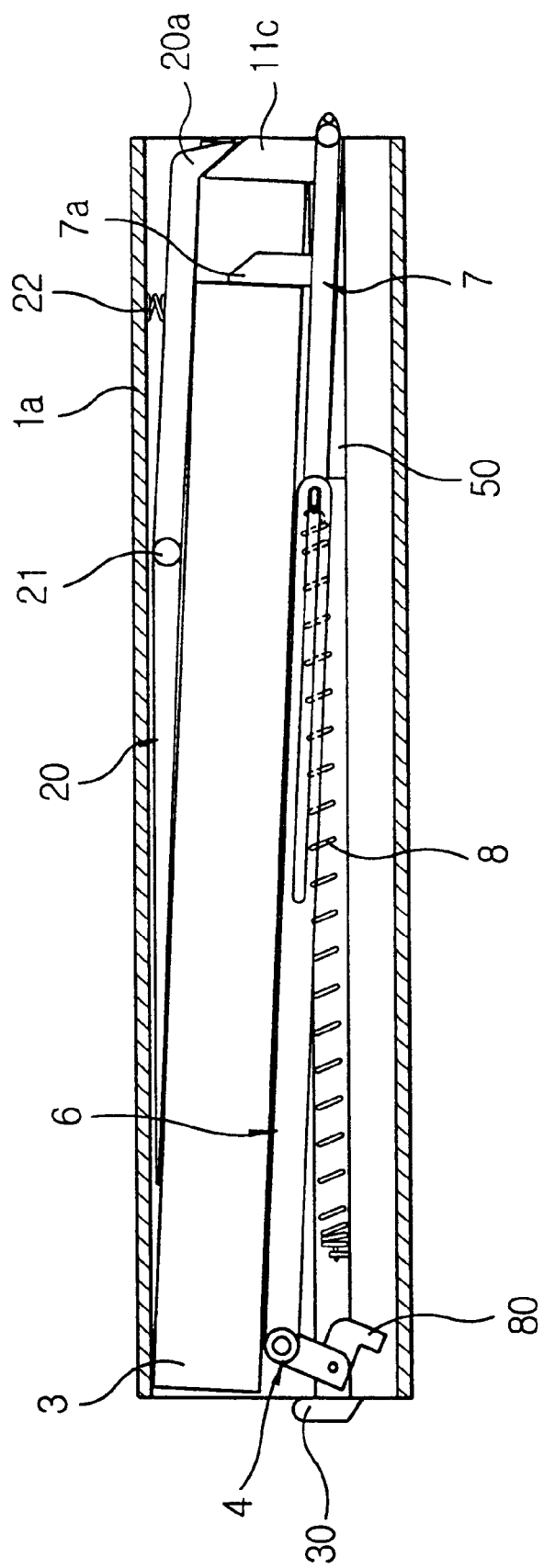
Figure 8C:
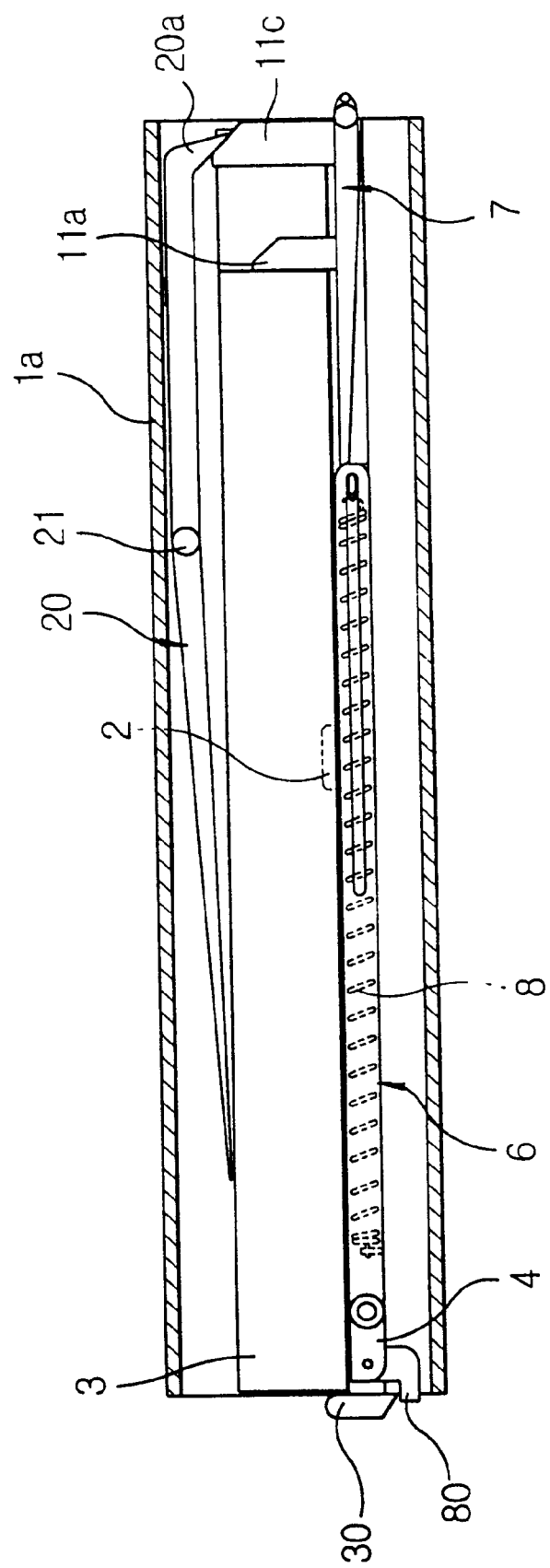

FIGS. 8A to 8C are views for showing the structure and operation of the disk cartridge loading apparatus according to the third embodiment of the present invention. The third embodiment of the present invention will be described with reference to these figures.

In the description of the third embodiment, the like elements will be given the same reference numerals as the first and second embodiments, and specific description thereof will be omitted.

As seen from the figures, the basic structure of the third embodiment is quite similar to that of the first and second embodiments.

Accordingly, the loading apparatus of the third embodiment essentially includes a tray 1, a link mechanism, positioning means, blocking means, and withdrawing means. The link mechanism includes cam links 4 and 4' which are rotatably disposed on the tray floor surface at the entrance of the tray 1 via the shaft pin 5. The link mechanism supports and guides the disk cartridge 3 at a predetermined inclined angle in the initial stage of its insertion. The positioning means positions a disk (not shown) accommodated in the disk cartridge 3 on the spindle motor shaft 2 by pressing down the upper rear end of the disk cartridge 3 at the end of the insertion of the disk cartridge 3 which is guided by the link mechanism. The blocking means blocks the disk cartridge 3 to prevent an accidental separation of the disk cartridge 3 from the tray 1 in a state that the disk cartridge 3 is positioned in the tray 1. Upon insertion of the disk cartridge 3 into the tray 1, as shown in FIG. 8C, the second slider link 7 is locked by the blocking projection 30 and the stop elevation 11a. The withdrawing means withdraws the disk cartridge 3 from the tray 1 for the unloading process of the disk cartridge 3.

The link mechanism includes a cam link 4, a first slider link 6 whose one end is linked to the upper end of the cam link 4, a second slider link 7 disposed to move along a slide groove 6a of the first slider link 6, and an inclined guiding section 50 disposed on the floor surface of the tray 1 for guiding the second slider link 7 during the movement of the second slider link 7.

The positioning means has the identical structure of that of the first embodiment, so that the description thereof will be substituted by the earlier description. Now, attention to the unique features of the third embodiment will be made, i.e., the withdrawing means.

The withdrawing means according to the third embodiment has a simple structure including a tension coil spring 8 to elastically support the second slider link 7 in the direction of the tray 1 (outward with respect to the tray 1), and a withdrawing lever 80 to rotate the cam link 4, and extending from one side of the cam link 4 to protrude outward from the entrance of the tray 1.

According to the third embodiment, the loading process of the disk cartridge 3 is performed in the same way as described above in the description of the first embodiment. On the withdrawal of the disk cartridge 3, the withdrawing lever 80 is depressed by a user, and thus the cam link 4 is rotated in a counterclockwise direction to elevate the disk cartridge 3 to the withdrawal height of the disk cartridge. Then, the second slider link 7 is biased in the direction of the entrance of the tray 1 (retreats) due to the elasticity of the tension coil spring 8, and the disk cartridge 3 is withdrawn outward from the tray 1.

As described above, according to the disk cartridge loading apparatus of the present invention, the number of parts which are moved during the loading process of the disk cartridge 3 is minimized by using the link mechanism to move the disk cartridge 3 to the loading position of the tray 1 through its rotational movement. Also, in comparison with the loading apparatus employing a conventional movable slider, the loading apparatus of the present invention can reduce the wear and damage occurring to the spindle motor that may occur while the disk cartridge 3 is loaded to the loading position. As a result, the reliability in loading the disk cartridge 3 is enhanced.

While the embodiments of the present invention has been particularly shown and described, it will be understood by those skilled in the art that various changes in form and details may be effected therein without departing from the spirit and scope of the invention as claimed by the appended claims.

What is claimed is:

1. A loading apparatus to load a disk cartridge which accommodates a disk into a device having a tray and a spindle motor, wherein the tray receives the disc cartridge to record and/or reproduce information on/from the disk, the loading apparatus comprising:

a link mechanism to guide the disk cartridge at a predetermined inclined angle while the disk cartridge is in an initial stage of insertion inserted into the tray;

means for positioning the disk accommodated in the disk cartridge on the spindle motor by biasing a surface of the disk cartridge in a final stage of movement of the disk cartridge into the tray;

means for blocking the disk cartridge to prevent the disk cartridge positioned in the tray by the positioning means from being separated from the tray; and means for withdrawing the disk cartridge from the tray.

2. The loading apparatus as claimed in claim 1, wherein the link mechanism comprises:

a shaft pin;

a cam link, rotatably disposed on a floor surface of the tray at an entrance of the tray via the shaft pin to extend a predetermined height from the floor surface of the tray, to support and guide the disk cartridge to be inserted into the tray at the predetermined inclined angle in the initial stage of the disk cartridge insertion;

a first slider link linked to an upper end of the cam link on a first end thereof, the first slider link extending from an end of the cam link and being long enough to reach a predetermined position in the tray, the first slider link having a slide groove extending from a center to a second end thereof;

a second slider link disposed to be moved along the slide groove of the first slider link, the second slider link having a projection on one side thereof which contacts a leading end of the disk cartridge upon insertion of the disk cartridge into the tray, so that the second slider link is moved together with the disk cartridge toward an inner portion of the tray by a pushing force applied to the disk cartridge by a user;

a latch lever disposed on one end of the second slider link to be elastically supported in a first rotational direction; and a third slider link having a locking elevation to which the latch lever is locked, the third slider link extending from the entrance of the tray toward the inner portion of the tray, wherein the third slider link moves together with the second slider link by interlocking the locking elevation thereof with the latch lever.

3. The apparatus as claimed in claim 2, wherein the positioning means comprises:

a pin;

a press member disposed in the inner portion of the tray and pivotable about the pin, the press member having a press section to contact the surface of the disk cartridge, and an operational section formed on one end thereof and having an inclined surface of a predetermined angle;

an operational projection having a slanted surface to correspond with the inclined surface of the operational section of the press member, the operational projection protruding from one end of the third slider link, the operational projection rotating the press member on the pin in a second rotational direction during the movement of the third slider link; and a spring disposed between the press member and the tray, to elastically support the press member in the first rotational direction.

4. The apparatus as claimed in claim 2, wherein the disk cartridge blocking means comprises a block projection protruding upward from a lower portion of the entrance of the tray to a height which is lower than the cam link when the cam link is in a standing position prior to and during the initial stage of the disk cartridge insertion.

5. The apparatus as claimed in claim 2, wherein the withdrawing means comprises:

a first tension coil spring to elastically support the second slider link in a direction of the entrance of the tray;

a second tension coil spring to elastically support the third slider link in a direction of the entrance of the tray;

a withdrawing piece extending from the latch lever;

a solenoid valve, having an operational rod disposed to bias the withdrawing piece to rotate the latch lever, wherein the rotation of the latch lever unlocks the third slider from a locked position relative to the tray; and an operational end, formed on an end of the third slider link, to rotate the cam link at the entrance of the tray during the movement of the third slider link in the direction of the entrance of tray.

6. The apparatus as claimed in claim 5, wherein the cam link comprises an inclined surface integrally formed on one side thereof, wherein the inclined surface contacts the operational end of the third slider link during the initial storage of the disk cartridge insertion, so that the cam link is prevented from rotating before movement of the third slider link in a direction opposite to the entrance of the tray.

7. The apparatus as claimed in claim 2, wherein the second slider link is disposed on the floor surface of the tray and comprises a slide section and an inclined guiding section disposed on the slide section, to guide the movement of the second slider link relative to the tray.

8. The apparatus as claimed in claim 1, wherein the link mechanism comprises:

a shaft pin;

a cam link, rotatably disposed on a floor surface of the tray at an entrance of the tray via a shaft pin to extend a predetermined height from the floor surface of the tray, to support and guide the disk cartridge to be inserted into the tray at the predetermined inclined angle in the initial stage of the disk cartridge insertion;

a first slider link linked to an upper end of the cam link on a first end thereof, the first slider link extending from an end of the cam link and being long enough to reach a predetermined position in the tray, the first slider link having a slide groove extending from a center to a second end thereof;

a second slider link disposed to be moved along the slide groove of the first slider link, the second slider link having a projection on one side thereof which contacts a leading end of the disk cartridge upon insertion of the disk cartridge into the tray, so that the second slider link is moved together with the disk cartridge toward an inner portion of the tray by a pushing force applied to the disk cartridge by a user;

an inclined guiding section disposed on the floor surface of the tray to guide the movement of the second slider link, and defining a locking hole as an opening in a portion of the inclined guiding section;

a third slider link having a press projection protruding outward from the entrance of the tray, the third slider link extending from outward of the entrance of the tray toward the inner side of the tray and adjacent to the first and second slider links; and a hook disposed on a side of the third slider link, to be elastically supported in a first rotational direction, the hook being locked in the locking hole of the inclined guiding section to maintain an initial position of the third slider link, the hook being inserted into the locking hole of the inclined guiding section by the user pressing the press projection of the third slider link so that the third slider link is locked, the hook being pushed from the locking hole of the inclined guiding section by the inclined projection of the second slider link when the second slider link is moved in a direction away from the entrance of the tray, and separated from the locking hole of the inclined guiding section so that the third slider link is unlocked.

9. The apparatus as claimed in claim 8, wherein the positioning means comprises:

a pin;

a press member disposed in an inner portion of the tray and pivotable about the pin, the press member having a press section to contact the surface of the disk cartridge, and a guide roller formed on one end thereof;

an operational projection protruding from an end of the third slider link, the operational projection having a slanted surface in contact with the guide roller of the press member, and rotating the press member in the first rotational direction as the third slider link moves toward the entrance of the tray in the final stage of the movement of the disk cartridge; and a spring disposed between the press member and the tray, to elastically support the press member in a second rotational direction.

10. The apparatus as claimed in claim 8, wherein the disk cartridge blocking means comprises a blocking projection protruding upward from a lower portion of the entrance of the tray to a height which is lower than the cam link when the cam link is in a standing position prior to and during the initial stage of the disk cartridge insertion.

11. The apparatus as claimed in claim 8, wherein the withdrawing means comprises:

the press projection extending from an end of the third slider link, and protruding outward from the entrance of the tray through the lower portion of the cam link;

a first tension coil spring to elastically support the second slider link in a direction of the entrance of the tray;

a second tension coil spring to elastically support the third slider link in the direction of the tray;

a rack, formed on a contacting area of the third slider link, to rotate the cam link by the movement of the third slider link; and a pinion formed on the cam link to correspond with the rack of the third slider link, wherein the cam link is rotated in a first rotational direction to elevate the disk cartridge to a height for disk cartridge withdrawal by a user pressing the press projection of the third slider link, and sequentially, the first tension coil spring causes the second slider link to move so that the disk cartridge retreats through the entrance of the tray.

12. The apparatus as claimed in claim 1, wherein the link mechanism comprises:

a shaft pin;

a cam link, rotatably disposed on a floor surface of the tray at an entrance of the tray via a shaft pin to extend a predetermined height from the floor surface of the tray, to support and guide the disk cartridge to be inserted into the tray at the predetermined inclined angle in the initial stage of the disk cartridge insertion;

a first slider link, linked to an upper end of the cam link on a first end thereof, the first slider link extending from an end of the cam link and being long enough to reach a predetermined position in the tray, the first slider link having a slide groove extending from a center to a second end thereof;

a second slider link disposed to be moved along the slide groove of the first slider link, the second slider link having a projection on one side thereof which contacts a leading end of the disk cartridge upon insertion of the disk cartridge into the tray, so that the second slider link is moved together with the disk cartridge toward an inner portion of the tray by a pushing force applied to the disk cartridge by a user; and an inclined guiding section disposed on a side of the floor surface of the tray, to guide the movement of the second slider link.

13. The apparatus as claimed in claim 12, wherein the positioning means comprises:

a pin;

a press member disposed in an inner portion of the tray cover and pivotable about the pin, the press member having a press section to contact the surface of the disk cartridge, and an operational section formed on one end thereof having an inclined surface of a predetermined angle;

an operational projection having a slanted surface corresponding with the inclined surface of the operational section of the press member, the operational projection protruding from one end of the second slider link, the operational projection rotating the press member on the pin in a first rotational direction during the movement of the second slider link; and a spring disposed between the press member and the tray, to elastically support the press member in a second rotational direction.

14. The apparatus as claimed in claim 12, wherein the disk cartridge blocking means comprises a blocking projection protruding upward from a lower portion of the entrance of the tray to a height which is lower than the cam link when the cam link is in a standing position prior to and during the initial stage of the disk cartridge insertion.

15. The apparatus as claimed in claim 12, wherein the withdrawing means comprises:

a tension coil spring to elastically support the second slider link in a direction of the entrance of the tray; and a withdrawing lever to rotate the cam link, the withdrawing lever extending from one side of the cam link to protrude outward from the entrance of the tray, wherein the cam link is rotated in a first rotational direction to elevate the disk cartridge to a height for disk cartridge withdrawal by a user pressing the withdrawing lever, and sequentially, is the elasticity of the tension coil spring causes the disk cartridge to retreat through the entrance of the tray.

16. A loading apparatus to load a disk cartridge which accommodates a disk into a recording and/or reproducing apparatus having a tray and a spindle motor, wherein the tray receives the disc cartridge to record and/or reproduce information on/from the disk, the loading apparatus comprising:

a linking element rotatable about a fixed point; and a guiding mechanism, rotatably connected to the linking element, to linearly guide the disk cartridge at a predetermined inclined angle during a first stage of insertion of the disk cartridge into the tray, and rotatable relative to the link mechanism so that the link mechanism rotates about the fixed point to guide the disk cartridge in a non-linear movement to position the disk on the spindle motor during a second stage of the insertion of the disk cartridge into the tray.

17. The loading apparatus as claimed in claim 16, wherein the guiding mechanism comprises:

a first link mechanism having a flat surface;

a pin; and a press member, rotatable about the pin, and substantially parallel to the first link mechanism during the first stage of the insertion of the disk cartridge into the tray.

18. The loading apparatus as claimed in claim 16, wherein the linking element comprises:

a first cam link, positioned near a first side of an entrance of the tray, rotatably connected to the guiding mechanism;

a second cam link positioned near a second side of the entrance of the tray; and a shaft pin connecting the first and second cam links so that the second cam link moves in unison with the first cam link.

19. The loading apparatus as claimed in claim 16, wherein the guiding mechanism comprises:

the first link mechanism as a first slider link having an end rotatably connected to the linking element and a slide groove extending in a lengthwise direction thereof;

a second slider link movable along the slide groove of the first slider link, and having a projection on an end thereof which contacts when the disk cartridge is inserted a predetermined distance into the tray, so that the second slider link moves together with the disk cartridge upon further insertion of the disk cartridge into the tray beyond the predetermined distance;

a latch lever disposed on the end of the second slider link to be elastically in a rotational direction; and a third slider link having a locking elevation, wherein the locking elevation locks with the latch lever of the second slider link when the second slider link is moved past a predetermined point during the insertion of the disk cartridge into the tray, so that the third link mechanism moves in unison with the second link mechanism.

20. The loading apparatus as claimed in claim 19, further comprising a disk withdrawing mechanism which includes:

a first tension coil spring to bias the second slider link in a direction of the entrance of the tray;

a second tension coil spring to bias the third slider link in the direction of the entrance of the tray;

a withdrawing piece extending from the latch lever;

a powered operational rod to selectively bias the withdrawing piece to rotate the latch lever, to unlock the third slider link relative to the tray;

an operational end formed on an end of the third slider link, to rotate the linking element to be in a position perpendicular to a floor of the tray upon movement of the third slider link in the direction of the entrance of the tray due to the second tension coil, thereby inclining the first slider link;

wherein the second slider link moves in the direction of the entrance of the tray due to the first tension coil, to move the disk cartridge along the first slider link to withdraw the disk cartridge from the tray.

21. The loading apparatus as claimed in claim 16, wherein the guiding mechanism comprises:

the first link mechanism as a first slider link having an end rotatably connected to the linking element and a slide groove extending in a lengthwise direction thereof;

a second slider link movable along the slide groove of the first slider link, and having a projection on an end thereof which contacts when the disk cartridge is inserted a predetermined distance into the tray, so that the second slider link moves together with the disk cartridge upon further insertion of the disk cartridge into the tray beyond the predetermined distance;

an inclined guiding section disposed on the tray, to guide movement of the second slider link, and defining a locking hole as an opening in a portion of the inclined guiding section;

a third slider link having a press projection protruding externally from the recording and/or reproducing apparatus, the third slider link extending into an inner region of the tray; and a hook formed on a side of the third slider link, biased in a rotational direction, the hook being locked in the locking hole to maintain an initial position of the third slider link, the hook locking into the locking hole by a user pressing the press projection, the hook being released from the locking hole by the inclined projection when the second slider link is moved as the disk cartridge is inserted into the tray to release the third slider link so that the third slider link moves in the direction of the tray and the press projection extends externally from recording and/or reproducing apparatus.

22. The loading apparatus as claimed in claim 21, further comprising a disk withdrawing mechanism which includes:

the press projection;

a first tension coil spring to bias the second slider link in a direction of the entrance of the tray;

a second tension coil spring to bias the third slider link in the direction of the entrance of the tray;

a rack, formed on the third slider link, to rotate the linking element to be in a position perpendicular to a floor of the tray upon movement of the third slider link in the direction of the entrance of the tray due to the second tension coil in response to a user pushing the pressing projection, thereby inclining the first slider link;

a pinion formed on the linking element to correspond with the rack;

wherein the second slider link moves in the direction of the entrance of the tray due to the first tension coil, to move the disk cartridge along the first slider link to withdraw the disk cartridge from the tray.

23. The loading apparatus as claimed in claim 16, wherein the guiding mechanism comprises:

the first link mechanism as a first slider link having an end rotatably connected to the linking element and a slide groove extending in a lengthwise direction thereof;

a second slider link movable along the slide groove of the first slider link, and having a projection on an end thereof which contacts when the disk cartridge is inserted a predetermined distance into the tray, so that the second slider link moves together with the disk cartridge upon further insertion of the disk cartridge into the tray beyond the predetermined distance;

an inclined guiding section disposed on the tray, to guide movement of the second slider link.

24. The loading apparatus as claimed in claim 23, further comprising a disk withdrawing mechanism which includes:

a tension coil spring to bias the second slider link in a direction of the entrance of the tray; and a withdrawing lever extending externally from the recording and/or reproducing apparatus when the disk cartridge is fully loaded in the tray, to rotate the linking element to be in a position perpendicular to a floor of the tray in response to a bias from a user, thereby inclining the first slider link;

wherein the second slider link moves in the direction of the entrance of the tray due to the first tension coil in response to the withdrawing lever being biased by the user, to move the disk cartridge along the first slider link to withdraw the disk cartridge from the tray.

25. A loading apparatus to load a disk cartridge which accommodates a disk into a recording and/or reproducing apparatus having a tray and a spindle motor, wherein the tray receives the disc cartridge to record and/or reproduce information on/from the disk, the loading apparatus comprising:

means for linearly guiding the disk cartridge at a predetermined inclined angle during a first stage of insertion of the disk cartridge into the tray, and guiding the disk cartridge in a non-linear movement to position the disk on the spindle motor during a second stage of the insertion of the disk cartridge into the tray; and means for withdrawing the disk cartridge by releasing the guiding means in response to a user, so that the guiding means guides the disk cartridge in the non-linear movement in a reverse direction during a first stage of withdrawal of the disk cartridge from the tray, and guides the disk cartridge linearly in the predetermined inclined angle during a second stage of withdrawal of the disk cartridge from the tray.

26. The loading apparatus as claimed in claim 25, wherein the non-linear movement is an arc movement.

27. A loading apparatus to load a disk cartridge which accommodates a disk into a recording and/or reproducing apparatus having a tray and a spindle motor, wherein the tray receives the disc cartridge to record and/or reproduce information on/from the disk, the loading apparatus comprising:

a guiding mechanism to linearly guide the disk cartridge at a predetermined inclined angle during a first stage of insertion of the disk cartridge into the tray, and guide the disk cartridge in a non-linear movement to position the disk on the spindle motor during a second stage of the insertion of the disk cartridge into the tray; and a withdrawing mechanism connected to the guiding mechanism, to release the guiding mechanism in response to a user, so that the guiding mechanism guides the disk cartridge in the non-linear movement in a reverse direction during a first stage of withdrawal of the disk cartridge from the tray, and guides the disk cartridge linearly in the predetermined inclined angle during a second stage of withdrawal of the disk cartridge from the tray.

28. The loading apparatus as claimed in claim 27, wherein the non-linear movement is an arc movement.

29. A loading apparatus to load a disk cartridge which accommodates a disk into a recording and/or reproducing apparatus having a tray and a spindle motor, wherein the tray receives the disc cartridge to record and/or reproduce information on/from the disk, the loading apparatus comprising:

a guiding mechanism to guide the disk cartridge in a non-linear movement to position the disk on the spindle motor during a final stage of the insertion of the disk cartridge into the tray; and a withdrawing mechanism connected to the guiding mechanism, to release the guiding mechanism in response to a user, so that the guiding mechanism guides the disk cartridge in the non-linear movement in a reverse direction during a withdrawal of the disk cartridge from the tray.

30. The loading apparatus as claimed in claim 29, wherein the non-linear movement is an arc movement.

31. A loading apparatus to load a disk cartridge which accommodates a disk into a recording and/or reproducing apparatus having a tray and a spindle motor, wherein the tray receives the disc cartridge to record and/or reproduce information on/from the disk, the loading apparatus comprising:

a cam link rotatable about a fixed point; and a guide mechanism, rotatably connected to the linking element, to rotate the cam link between a first position and a second position, wherein when the cam link is at the first position the disk cartridge advances into and withdraws from the tray at a predetermined inclined angle, and as the disk cartridge is moved to and away from the second position, the disk cartridge moved in arc directions so that the disk is mounted on and removed from the spindle motor.

32. The loading apparatus as claimed in claim 31, wherein the first position is a position where the cam link is substantially perpendicular to a floor surface of the tray, and the second position is a position where the cam link is substantially parallel to the floor surface of the tray.

33. The loading apparatus as claimed in claim 32, further comprising a blocking protrusion extending lower in the entrance of the tray than the cam link when the cam link is in the first position, and higher in the entrance of the tray than the cam link when the cam link is in the second position.

* * * * *